W. H. CAMERON.
CLUTCH.
APPLICATION FILED JULY 10, 1911.

1,031,240.

Patented July 2, 1912.

2 SHEETS—SHEET 1.

WITNESSES:
C. H. Bills.
E. E. Thomas.

INVENTOR.
Wm. H. Cameron,
By Owen & Owen,
His attys.

W. H. CAMERON.
CLUTCH.
APPLICATION FILED JULY 10, 1911.

1,031,240.

Patented July 2, 1912.
2 SHEETS—SHEET 2.

WITNESSES:
C. H. Bills
E. E. Thomas

INVENTOR.
Wm. H. Cameron.
By Owen & Owen,
His attys.

UNITED STATES PATENT OFFICE.

WILLIAM H. CAMERON, OF TOLEDO, OHIO, ASSIGNOR TO THE WILLYS-OVERLAND COMPANY, OF TOLEDO, OHIO, A CORPORATION OF OHIO.

CLUTCH.

1,031,240.      Specification of Letters Patent.      Patented July 2, 1912.

Application filed July 10, 1911. Serial No. 637,729.

*To all whom it may concern:*

Be it known that I, WILLIAM H. CAMERON, a citizen of the United States, and a resident of Toledo, in the county of Lucas and State of Ohio, have invented certain new and useful Improvements in Clutches; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invntion relates to friction clutches, and particularly to clutches of the class especially adapted and intended for use in automobiles, but is not restricted to such use as it may be used in any connection for which it is applicable.

The object of my invention is the provision of an improved clutch of this character, which is capable of having the spring gripping tension of its clutch members easily and quickly adjusted by novices or persons not skilled in the adjusting of such parts, and which is also provided with means for eliminating a jerking action or sudden taking hold of the clutch parts during an engaging of the same, a feature which is incident to the clutches of this character commonly used, said means also providing an easy acting clutch to facilitate its use by women and children.

The invention is fully described in the following specification, and while in its broader aspect it is capable of embodiment in numerous forms, a preferred embodiment thereof is illustrated in the accompanying drawings, in which,—

Figure 1:
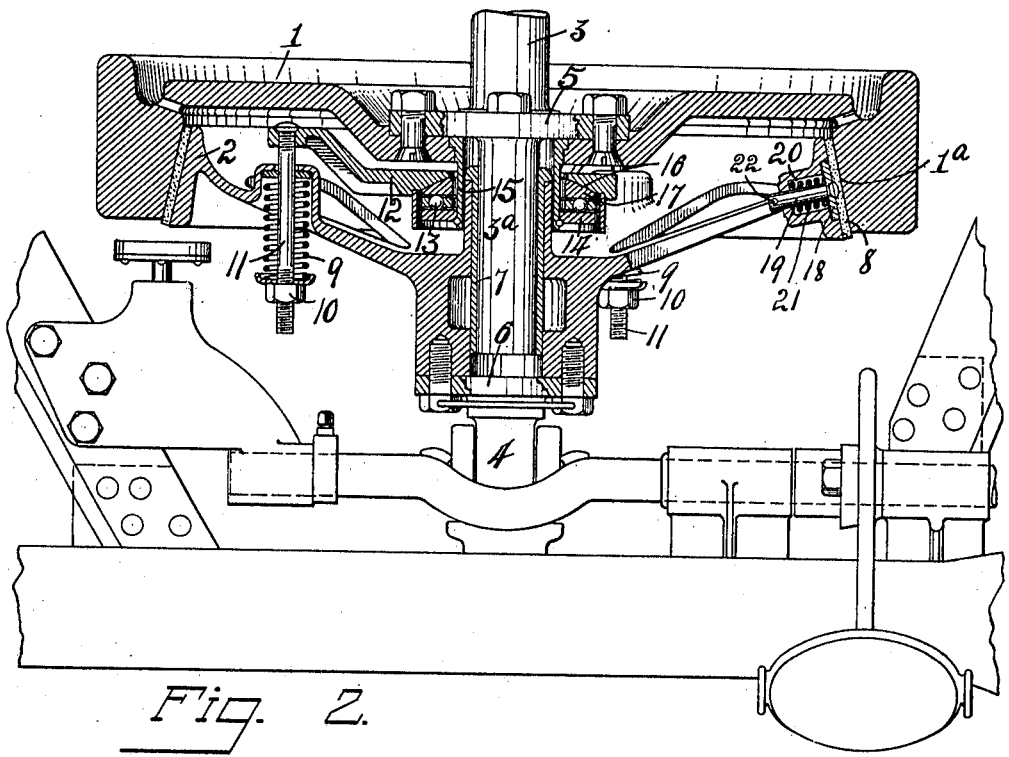
Figure 2:
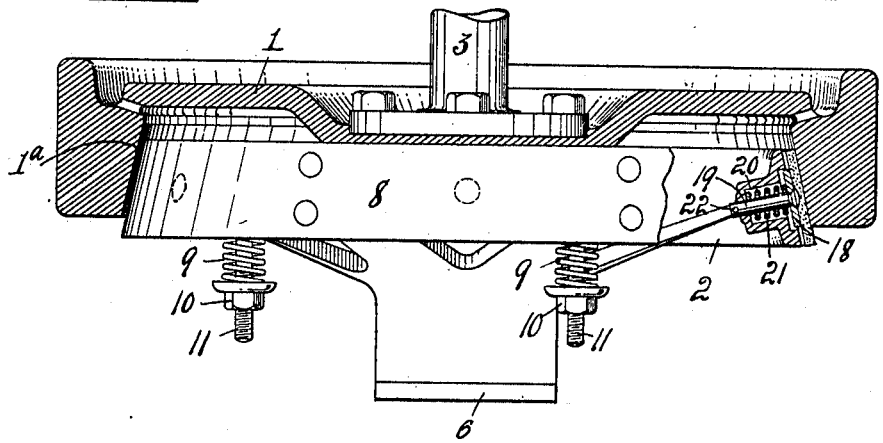
Figure 3:
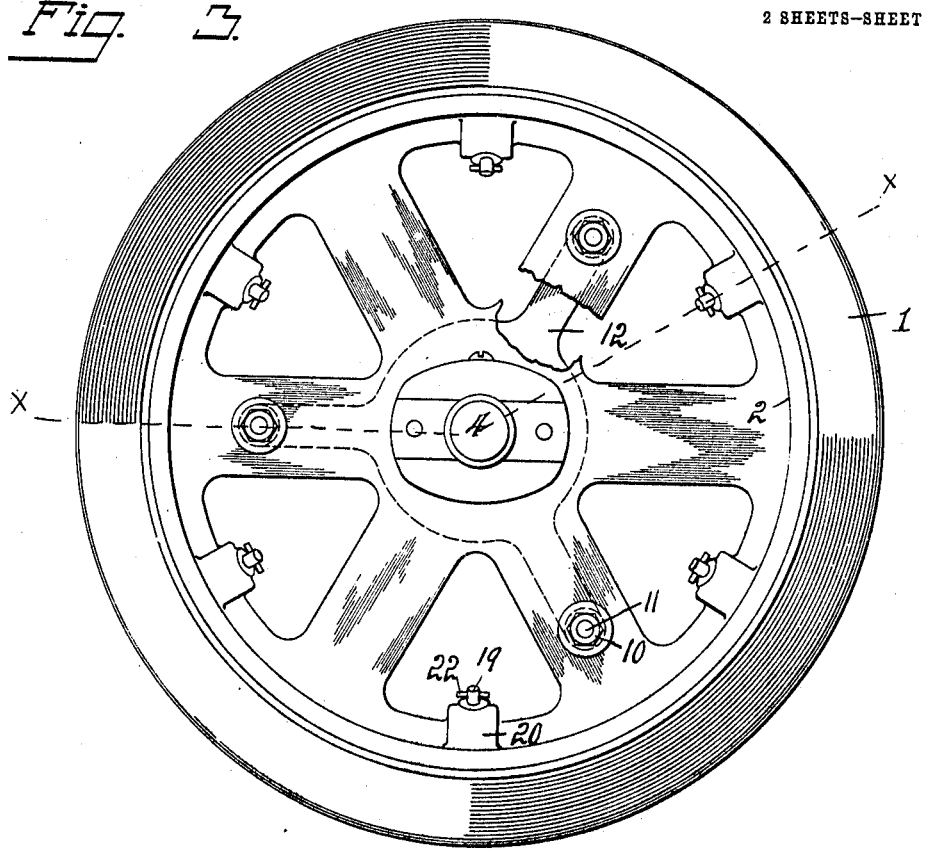
Figure 4:
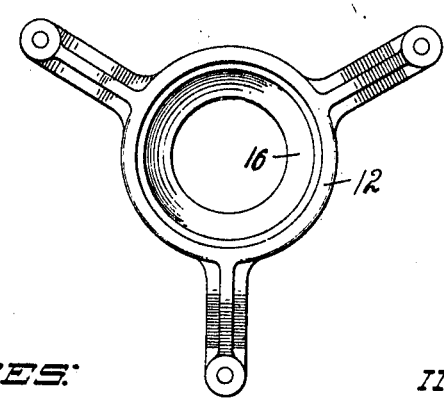

Figure 1 is a section of the clutch embodying my invention taken on the line $x$ $x$ in Fig. 3 with the clutch parts in full engagement. Fig. 2 is a similar section thereof with the movable clutch member only partially broken away and out of full engagement with its companion member. Fig. 3 is an inner side view of the clutch with a portion broken away, and Fig. 4 is a face view of the thrust spider for the clutch springs.

Referring to the drawings, 1 designates, in the present instance, the drive member and 2 the driven member of the clutch, which are respectively secured in any suitable manner to axially-alining relatively-rotatable shaft sections 3 and 4.

The clutch member 1 is shown as being bolted to a flange 5 on the shaft section 3, and has its rim or peripheral portion laterally flanged and provided with the inner conical clutch surface $1^a$, as is common in clutches of this type. The clutch member 2, which is the movable member, is fixed to the inner end of the shaft section 4, as by being screwed to a flange 6 thereon, and has a longitudinally sliding fit on the inner end portion $3^a$ of the shaft section 3, a bearing bushing 7 being preferably interposed between the two. The rim portion of the clutch member 2 is of conical form to adapt it to fit within and coact with the conical clutch surface of the member 1, and is faced with leather or other suitable material 8, as is common in clutches of this class.

The clutch members are yieldingly held in engagement by the action of a set of coiled expansion springs 9, which are disposed on the outer side of the members 2 and have their inner ends thrust against said member and their outer ends thrust against adjusting nuts 10 on bolts 11, which bolts project through the springs and web or spoke portion of the member 2 and are securely attached at their inner ends to a spider 12, which is rotatably anchored to the clutch member 1. The thrust of the spider 12 is in the direction of the member 2, as is apparent, and is sustained by a set of ball-bearings 13, which have their outward bearing against an annular flange or thrust collar 14 that is carried by a tubular part 15 projecting from the shaft flange 5 and encircling a portion of the drive shaft part $3^a$.

While the construction of the clutch above described is generally old, a feature of my invention in connection with the same consists in mounting the spider 12 for universal movements relative to the fixed member 1 of the clutch to facilitate an adjusting of the tension of the clutch springs 9 and to prevent an uneven engaging of the clutch members should the adjustment be such as to make the tension of one spring greater than another, thus obviating one of the very objectionable features incident to this class of clutches. To accomplish this the center opening of the spider 12 is larger than the tubular part 15 which it encircles to permit it to have free oscillatory movements relative to such part, and the outer marginal wall of such opening is dished or annularly concaved, as at 16, to adapt it to coöperate with an annular male member 17, against which it has its thrust, to form a ball and socket joint, said member 17 being interposed between the spider 12 and the ball bearings 13. It is thus apparent that the spider 12 is not only permitted to rotate freely with the clutch member 2 relative to the clutch member 1 to which it is anchored, but is also permitted to have free universal pivotal movements upon its thrust part to accommodate itself to a differential tensioning of the clutch springs 9. This feature is found in practice to be of the utmost importance in the practical and efficient running of a clutch of this character as no special care need be taken to secure a like adjustment of the tension springs, and any novice can easily and quickly effect such adjustment without the assistance of an expert. The need of an easily and simply adjusted clutch of this nature is frequently felt, especially in country driving, as an adjustment which would be sufficient for city or normal driving would not be sufficient to prevent a slipping of the clutch members when subjected to an extraordinary load, such as the climbing of a steep hill, the pulling out of a ditch, deep rut, or the like. In such case, with the present invention, it is a simple matter to turn the nuts 10 on the bolts 11 to effect a tightening of the tension of the springs 9. Should one nut be turned more than the others the spider 12 will automatically adjust itself to equalize the tension of the several springs upon the clutch member 2.

In the construction of clutches of the character described it is common to provide spring pressed plungers 18 at spaced intervals around the periphery of the clutch member 2 for acting against the facing 8 thereof for normally holding the same radially extended at the points of contact of the plungers therewith, said extended portions serving to first take hold of the member 1 when the member 2 is moving into engagement therewith. The plungers 18 when retracted seat within registering countersinks in the periphery of the member 2 and have stems 19 projecting inwardly therefrom and working through registering openings in the bases of spring sockets 20 on the rim of the member 2. Coiled compression springs 21 encircle the stems 19 within said sockets and have their opposite ends thrust against the bases of the sockets and the plungers to normally influence an outward projection of the plungers, as shown in Fig. 2. In the use of these spring actuated plungers it has been the practice, so far as I am aware, to limit the outward movements of the plungers by the facing 8 which is riveted to the member 2 at points intermediate the plungers. This has been found impractical for the reason that the stretching of the facing would permit too great a projection of the plungers so as to interfere with an engaging of the clutch members and therefore necessitated the use of springs which were so weak as to be of little assistance in the clutch action. To overcome this feature and to enable strong tensioned springs to be used to hold the plungers 18 projected with sufficient force to cause a smooth and steady starting of a car when the clutch members are moving into engagement, and before the movable member has reached the limit of its engaging movement, I provide stop-pins 22, or other suitable means, on the stems 19 without the inner ends of the sockets 20 to coact therewith to limit the outward movements of the plungers. With the movements of the plungers limited in this manner it is found preferable in practice to use springs 21 of sufficient tension to exert a pressure of approximately eighty pounds upon each plunger, thus causing the combined strength of the springs 21 and 9 to exert a very powerful clutching action upon the clutch members.

It is found in practice that the provision of strong tensioned springs for the plungers 18 has many advantages over the use of weak springs, such as it has heretofore been necessary to employ, principal among them being the ease and smoothness with which the clutch members take hold in the starting of a car and the complete elimination of the objectionable jerking action which is usually incident to the starting of a car unless extreme care be exercised to permit a very slow and gradual engaging of the clutch members. With the present construction a sudden unrestrained engaging of the clutch members may be permitted without danger of stripping the gears or twisting the driving axle of the machine, the plungers 18 acting to cause a gradual taking hold of the clutch parts to cause a steady starting of the machine.

It is apparent that I have provided certain improvements in friction clutches of the conical type which materially enhance the value of the same for use in motor driven vehicles.

I wish it understood that my invention is not limited to any specific construction or arrangement of the parts except in so far as such limitations are specified in the claims.

Having thus described my invention, what I claim as new and desire to secure by Letters Patent, is,—

1. In a clutch, two clutch members, and adjustable means yieldingly connecting said members to influence a normal engaging of the same, said means being automatically operable to equalize the adjustment of the yielding parts thereof.

2. In a clutch, two clutch members, means influencing a normal engaging of said members and having a plurality of adjustable spring pressure parts, said means being automatically operable to equalize the pressure of said parts upon the members irrespective of the adjustment thereof.

3. In a clutch, two relatively movable frictionally engaging clutch members, means rotatably carried by one member for universal pivotal movements relative thereto, and yieldable connection between said means and the other of said members to influence a normal engaging of said members.

4. In a clutch, a set of relatively movable frictionally coacting clutch parts, a member rotatably anchored to one of said parts for free universal oscillatory movements relative thereto, and a plurality of adjustable yielding connections between said member and the other of said clutch parts to cooperate with said member to influence a normal engaging of the clutch part.

5. In a clutch, a pair of relatively movable frictionally coacting clutch parts, a spider having a ball and socket ball bearing thrust against a part of one of said members in the direction of the other member, and a plurality of adjustable spring connections between said member and the other of said parts to influence a normal engaging of the clutch parts.

6. In a clutch, a pair of relatively movable parts having coacting conical clutch surfaces, a member rotatably anchored to one of said parts, stems projecting from said member through the other of said parts, nuts threaded to said stems without said other part, and coiled compression springs encircling said stems with their ends thrust against said nuts and part through which the stems project, said member being automatically adjustable relative to its carrying member to equalize the tension of said springs upon the coacting member.

In testimony whereof, I have hereunto signed my name to this specification in the presence of two subscribing witnesses.

WILLIAM H. CAMERON.

Witnesses:
C. W. OWEN,
E. E. THOMAS.